Aug. 31, 1926.
R. C. YOUNG
SPRING SHOCK ABSORBER
Filed Jan. 31, 1925
1,597,704
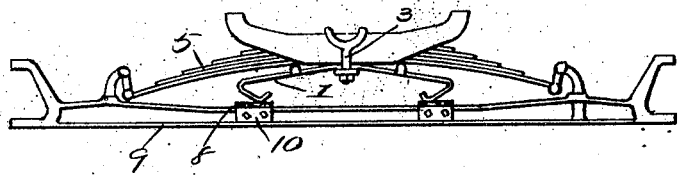
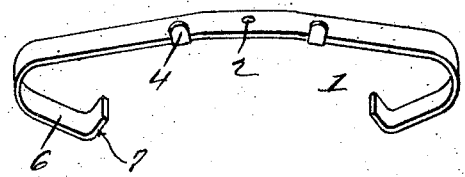
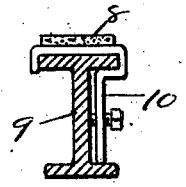
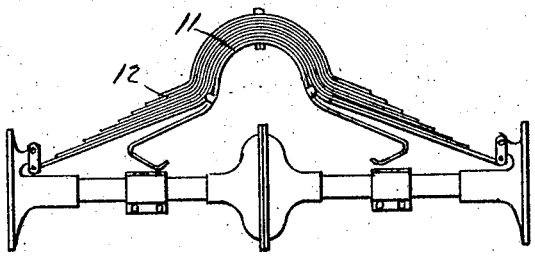
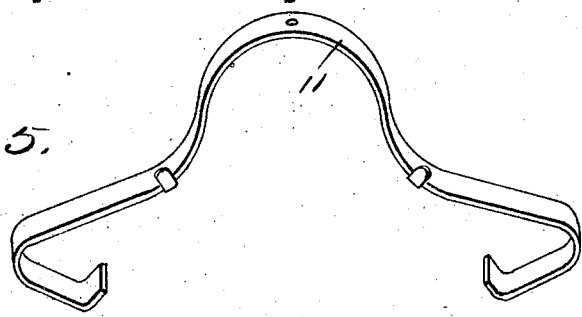
Inventor
R. C. Young
By Clarence A. O'Brien.
Attorney Patented Aug. 31, 1926.

1,597,704

UNITED STATES PATENT OFFICE.

RICHARD C. YOUNG, OF MIRANDO CITY, TEXAS.

SPRING SHOCK ABSORBER.

Application filed January 31, 1925. Serial No. 6,076.

This invention relates to spring shock absorbers especially adapted to be applied and used upon automobile machines, and it consists in the novel features hereinafter described and claimed.

An object of the invention is to provide a shock absorber of the above indicated character, which is of simple and durable structure and applied to the front and rear axles of an automobile machine, and which will serve to prevent the body of the machine from rocking laterally with relation to the axle, and which has its parts and features so arranged and assembled as to not interfere with the prescribed resiliency at the usual supporting spring of the automobile machine.

In the accompanying drawings:—

Figure 1 is a side elevation of the forward axle of an automobile machine showing the spring shock absorber applied thereto.

Figure 2 is a perspective view of the form of spring shock absorber shown in Figure 1.

Figure 3 is a detail sectional view, showing the buffer which is used in conjunction with the spring shock absorber.

Figure 4 is a side elevation of the rear axle of an automobile machine and showing a slightly modified form of the spring shock absorber applied thereto.

Figure 5 is a perspective view of the spring shock absorber shown in Figure 4.

In the form of the invention as illustrated in Figures 1 and 2 of the drawings, the same consists of a spring member 1, having at a point between its ends an opening 2, through which a clip bolt 3 may pass for securing the said shock absorber in position below the forward spring of the automobile machine. The spring member 1 is provided at one edge with upstanding lugs 4, which are adapted to engage an edge of spring 5, whereby the said spring member is held against turning movement with relation to the spring 5. The spring member 1 is provided with inturned end portions 6 having angular disposed extremities 7, which are disposed upwardly and inwardly, and under the intermediate portion of the member 1. Buffer strips 8 are mounted upon the axle 9 and are held by brackets 10. The said buffer members 8 are located under the portions 6 and 7 of the spring member 1.

In the form of the invention as illustrated in Figures 4 and 5 of the drawings, the same general arrangement of the elements and features is observed as that described in connection with the form of the invention illustrated in Figures 1 and 2, and with the exception that the intermediate portion of the spring member 1 is curved, as at 11, and is adapted to fit under the nested curved sections of the rear spring 12 of the automobile machine.

When the device is applied, the portions 6 and 7 of the spring member are slightly spaced above the buffer plate 5 and consequently the spring member 1 does not interfere with the resiliency of the springs 5 and 12. However, should the body of the automobile machine tend to rock with relation to the axles thereof, the portions 6 and 7 of the spring members come in contact with the buffer plate 8 and the said rocking movement is checked.

Having described the invention, what is claimed is:—

1. A spring shock absorber adapted to be used in conjunction with the springs and axle of an automobile machine comprising a plate member having inwardly disposed end portions provided with upwardly and angularly disposed extremities, the intermediate portions of the spring member being arched so that the extremities are disposed on a concaved side thereof, and lugs projecting from one edge of the intermediate portion.

2. A spring shock absorber adapted to be used in conjunction with the springs and axle of an automobile machine comprising a plate member having inwardly disposed end portions provided with upwardly and angularly disposed extremities, the intermediate portions of the spring member being arched so that the extremities are disposed on a concaved side thereof, lugs projecting from one edge of the intermediate portion, and buffer plates adapted to be applied to the axle below the inwardly disposed end portions of the spring member.

In testimony whereof I affix my signature.

RICHARD C. YOUNG.